United States Patent
Choudhary et al.

(10) Patent No.: US 11,106,697 B2
(45) Date of Patent: Aug. 31, 2021

(54) READING OWN WRITES USING CONTEXT OBJECTS IN A DISTRIBUTED DATABASE

(71) Applicant: HEWLETT PACKARD ENTERPRISE DEVELOPMENT LP, Houston, TX (US)

(72) Inventors: Anurag Choudhary, San Jose, CA (US); Narendra Agrawal, San Jose, CA (US); Chris Westin, San Jose, CA (US); Aditya Kishore, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 220 days.

(21) Appl. No.: 16/190,052

(22) Filed: Nov. 13, 2018

(65) Prior Publication Data

US 2019/0146980 A1 May 16, 2019

Related U.S. Application Data

(60) Provisional application No. 62/586,474, filed on Nov. 15, 2017.

(51) Int. Cl.
| | |
|---|---|
| *G06F 16/27* | (2019.01) |
| *G06F 16/2458* | (2019.01) |
| *G06F 16/22* | (2019.01) |
| *G06F 16/23* | (2019.01) |

(52) U.S. Cl.
CPC ........ *G06F 16/273* (2019.01); *G06F 16/2282* (2019.01); *G06F 16/2358* (2019.01); *G06F 16/2477* (2019.01)

(58) Field of Classification Search
CPC .............. G06F 16/273; G06F 16/2282; G06F 16/2477; G06F 16/2358
See application file for complete search history.

(56) References Cited

U.S. PATENT DOCUMENTS

| | | | | |
|---|---|---|---|---|
| 7,822,711 | B1* | 10/2010 | Ranade | G06F 16/10 707/622 |
| 10,324,905 | B1* | 6/2019 | Ross | G06F 16/23 |
| 2005/0216421 | A1* | 9/2005 | Barry | G06F 16/972 705/64 |
| 2008/0183747 | A1* | 7/2008 | Mangipudi | G06F 16/2246 |
| 2009/0012932 | A1* | 1/2009 | Romem | G06F 16/2282 |

(Continued)

*Primary Examiner* — James Trujillo
*Assistant Examiner* — Michal Bogacki
(74) *Attorney, Agent, or Firm* — Hewlett Packard Enterprise Patent Department

(57) ABSTRACT

In embodiments, a context object is created when a write operation is initiated. The client application or user performs a write operation to a table and receives a context object which has information on all the tablets that are impacted by writes by the client application. In embodiments, the context object may contain a list describing what key ranges the client application has updated. As such, only that small portion of what has been touched needs to be looked for and this typically only includes a small subset of tablets compared to all the tablets associated with that table. This leads to a small verification cost when checking only impacted tablets in the cluster. The only portion of the table in the database that needs to be verified is the one or more portions that were updated and nothing else.

21 Claims, 3 Drawing Sheets

(56) References Cited

U.S. PATENT DOCUMENTS

| | | | |
|---|---|---|---|
| 2010/0115000 A1* | 5/2010 | Youngren | G06F 16/2358 |
| | | | 707/818 |
| 2014/0279855 A1* | 9/2014 | Tan | G06F 16/273 |
| | | | 707/609 |
| 2018/0276234 A1* | 9/2018 | Wei | G06F 16/2308 |

* cited by examiner

READING OWN WRITES USING CONTEXT OBJECTS IN A DISTRIBUTED DATABASE

CROSS REFERENCE TO RELATED APPLICATIONS

This application claims priority to U.S. provisional patent application Ser. No. 62/586,474, filed Nov. 15, 2017, which is incorporated herein in its entirety by this reference thereto.

FIELD

The invention relates to data processing. More particularly, the invention relates to reading own writes using context objects in a distributed database.

BACKGROUND

As is known, client applications make frequent queries and updates to databases which, in many current computing environments, are distributed. A table in a database may be distributed over multiple nodes, e.g. 100s of nodes.

As is known, client applications make frequent queries and updates to databases. In many current computing environments, these databases are distributed. A table in a database may be distributed over multiple nodes, e.g. 100s of nodes.

As is known in the field, a table may also have what is referred to as a secondary index. When a write is done to a table initiated by an application, the index for that table is also updated, typically to facilitate subsequent queries. In a distributed system, the index is generally updated asynchronously; this means that the write returns as soon as the table itself is updated, but before the index is confirmed to have been updated. Remote replicas of the table might be updated in a similar asynchronous fashion. Because an acknowledgement is sent to the client as soon as the table itself has been updated, but before the index and remote replicas are updated, it is possible for the client application to initiate a read to the index and remote replicas before the previous update has been applied to them.

The delay before this update is propagated to all indexes and remote replicas depends, naturally, on the size and complexity of the distributed computing system, as well as the extent that the specific table is distributed over the system. Because the index is not updated immediately, it is possible that the user who initiated the write operation and performs a read immediately on the same table does not see the write to the table if they attempt to read the table by using the index. The user may see older data when using the secondary index that has not been updated before the read occurs, but see newer data if the table is accessed directly. This can make it difficult to write programs that function correctly. Likewise, the client application may cause some other application to issue a read that may or may not use the index or the main table. If that read occurs soon after the acknowledgment of the original write, inconsistent results may also be observed by this other application as well.

In many applications, it has become increasingly important for a client application to see data that is consistent with the recent actions of the client application in the primary table and secondary index after the write is performed. No matter how quickly the write is executed, the client application must be able to guarantee that subsequent operations see the results of the write. This is presently not guaranteed or even verifiable with distributed databases. It would be preferable if the client application could verify that reads from the secondary index at any time are true and up-to-date relative to all writes done by that application.

It is not, however, acceptable to check each subdivision of a table and each subdivision of each index or remote replica to determine whether all consequences a write has completed. As noted, a distributed table is spread out among multiple nodes. A node, for example, can have computing, storage, and storage access capabilities, for instance sixteen CPUs and either disk drives or solid state drives for storage. For example, one node can store ten terabytes of data. A table is comprised of multiple subdivisions, also referred to as tablets. Typically, a table is comprised of hundreds of tablets. Data in a table is stored in these tablets, typically organized by the primary key of the table. As noted, the time it takes to verify that a corresponding index for a tablet is up-to-date is directly proportional to the number of tablets comprising the table. Each and every one of the subdivisions that has data belonging to the table needs to be checked to see if a corresponding index has been updated for this tablet. This is a significant time consuming task.

SUMMARY

In embodiments, a context object is created when a write operation is initiated. The client application or user performs a write operation to a table and receives a context object that has information on all the tablets that are impacted by writes by the client application.

In embodiments, the context object may contain a list describing what key ranges the client application has updated. As such, only that small portion of what has been touched needs to be looked for and this typically only includes a small subset of tablets compared to all the tablets associated with that table. This leads to a small verification cost when checking only impacted tablets in the cluster. The only portion of the table in the database that needs to be verified is the one or more portions that were updated and nothing else.

DRAWINGS

DESCRIPTION

Figure 1:
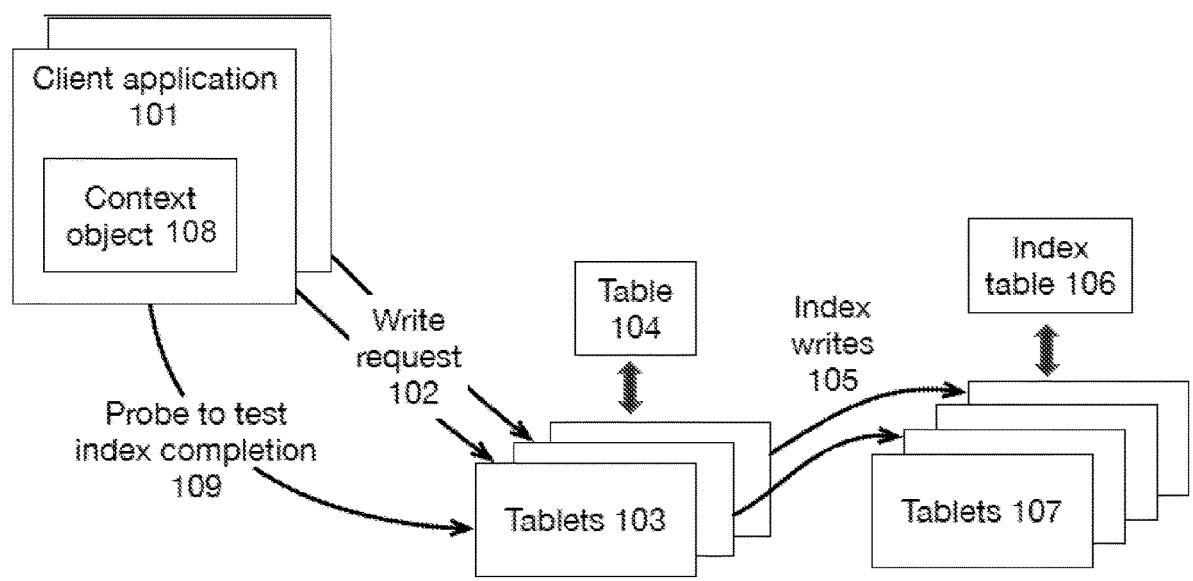
FIG. 1 is a block diagram showing a mechanism for reading own writes using context objects in a distributed database.

In embodiments, a context object is created when a write operation is done. The client application or user performs a write operation to a table by dividing the write into subsidiary writes according to the allocation of key ranges to tablets in the table and then sending each part of the write operation to the each tablet affected. From each tablet, the client application receives a context object that has information on the write operation for that tablet. Taken together, the information in the context objects returned from each tablet regarding the individual writes by the client application can be combined into a context object for the entire write operation. In many cases, of course, a write updates only a single row. In such a case, the context object for the write operation would be identical to the context object returned from the single affected tablet.

In embodiments, the context object may contain a list describing what key ranges the client application has updated. As such, only that small portion of what has been touched needs to be looked for and this typically only includes a small subset of tablets compared to all the tablets associated with that table. This leads to a small verification cost when checking only impacted tablets in the cluster. The only portion of the table in the database that needs to be verified is the one or more portions that were updated and nothing else.

The context object also contains timestamp data. The context object may contain a timestamp for the updates that is the latest timestamp of any of the updates to any tablet in the table. The context object may alternatively contain a timestamp for each key range that was updated.

Each write to table consists of writes to one or more tablets. Each tablet responds to a write operation by returning a confirmation of the write along with the timestamp associated with each write. Asynchronously, each tablet writes records to any secondary indexes and maintains the minimum timestamp of any pending secondary index writes. Because of the monotonicity of timestamps within each tablet, it is possible to determine whether any particular write has propagated successfully to the index by testing this minimum timestamp against the timestamp for the write.

When a client application reads data where the read is intended to be performed only after all indexes reflect the results of a previous write, the context object associated with that write can be used to test efficiently and possibly to wait for the completion of all indexing operations. At a minimum, the pending index timestamp for any tablets that are being queried can compared to the timestamp or timestamps in the context object. If query ranges affected by the write are retained in the context object, then the number of tablets to be queried can be reduced to the intersection of those involved in the query and those involved in the write.

The tablets can maintain independent statistical estimates of the indexing delays that they are seeing. They can combine this information with the timestamps of pending indexing operations to get an optimistic estimate of the earliest time that there is a significant probability that a particular timestamp is cleared. This estimate can be returned to the client application and used as a time to delay until the next time that the client application queries the tablet to see if all writes of interest have been indexed.

In embodiments, the contents of a context object can be passed from one client application to another. The client application that receives the context object can perform the test for index currency exactly the way that the original client application could do.

In embodiments, the contents of a context object can be returned to a web browser in the form of a cookie. This cookie can be decoded back into a context object by a Web application server and then used to verify that indexing operations have completed relative to a particular write.

In embodiments, context objects can be combined so that the indexing status of all of multiple writes can be tested in a single test. The combination would require that the union of all affected tables be kept and that the maximum of any timestamps be kept.

In this manner, the client application making the update to the table is guaranteed that an immediate subsequent read or write operation has a secondary index for the table that is true and up-to-date, reflecting the write that was just made by that user. Each subdivision or tablet in a node has its own internal structure for storing information on what data in the table has been changed and how much of that changed data has been synchronized with tables of the secondary index for that table.

FIG. 1 is a block diagram showing a mechanism for reading own writes using context objects in a distributed database.

In FIG. 1, a client application 101 makes one or more write requests 102 from any thread to tablets 103 that are associated with a table 104. The tablets 103 later perform index writes 105 to an index table 106 also composed of tablets 107. The timestamps of the original changes for pending index writes are maintained so that each tablet can determine whether a write has been propagated successfully by checking a timestamp.

The tablets return one or more context objects 108 as a result of the write request 102, typically long before the index writes 105 have completed. Subsequently, the client application 101 or any other program with a copy of the context object can probe the tables to determine if the changes due to the original write request 102 have been propagated to the tables (step 109).

Figure 2:
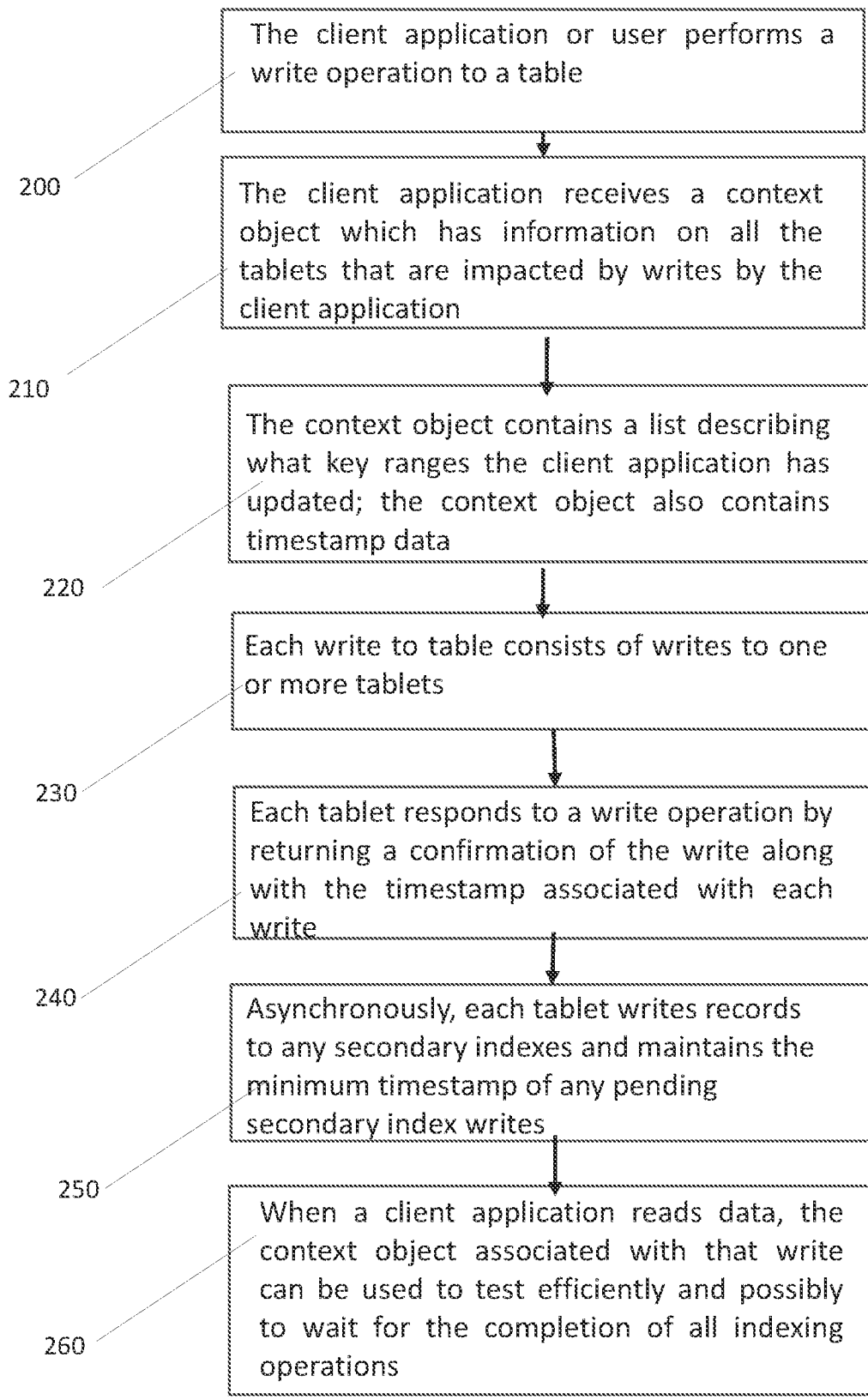
FIG. 2 is a flow diagram showing an overview of the process for reading own writes using context objects in a distributed database.

FIG. 2 is a flow diagram showing an overview of the process for reading own writes using context objects in a distributed database.

In FIG. 2:

The client application or user performs a write operation to a table (200) and receives a context object which has information on all the tablets that are impacted by writes by the client application (210).

The context object contains a list describing what key ranges the client application has updated. The context object also contains timestamp data (220).

Each write to the table consists of writes to one or more tablets (230).

Each tablet responds to a write operation by returning a confirmation of the write along with the timestamp associated with each write (240).

Each tablet writes records to any secondary indexes asynchronously and maintains the minimum timestamp of any pending secondary index writes (250).

When a client application reads data, the context object associated with that write can be used to test efficiently and possibly to wait for the completion of all indexing operations (260).

As noted, a context object has a subdivision identifier and a record of what writes were made to that subdivision by a specific user. Context objects require very little overhead with respect to storage or processing yet provide a significant advantage to users who require a guarantee and verification that secondary indexes are updated with previous writes to a primary table.

A similar mechanism can be used to track non-local replicas of the table. In such a case, each replica of any tablet would have a minimum timestamp for any pending replication to the replica of the tablet. This timestamp could be used to determine whether any data written by a client application had been replicated to the replica table. Each tablet in the replica can also record the last applied timestamp of any replication from another tablet. This allows the use of a context object to probe a replica to find out if the data written as part of the write associated with the context object has been fully propagated to the replica table.

Computer Implementation

Figure 3:
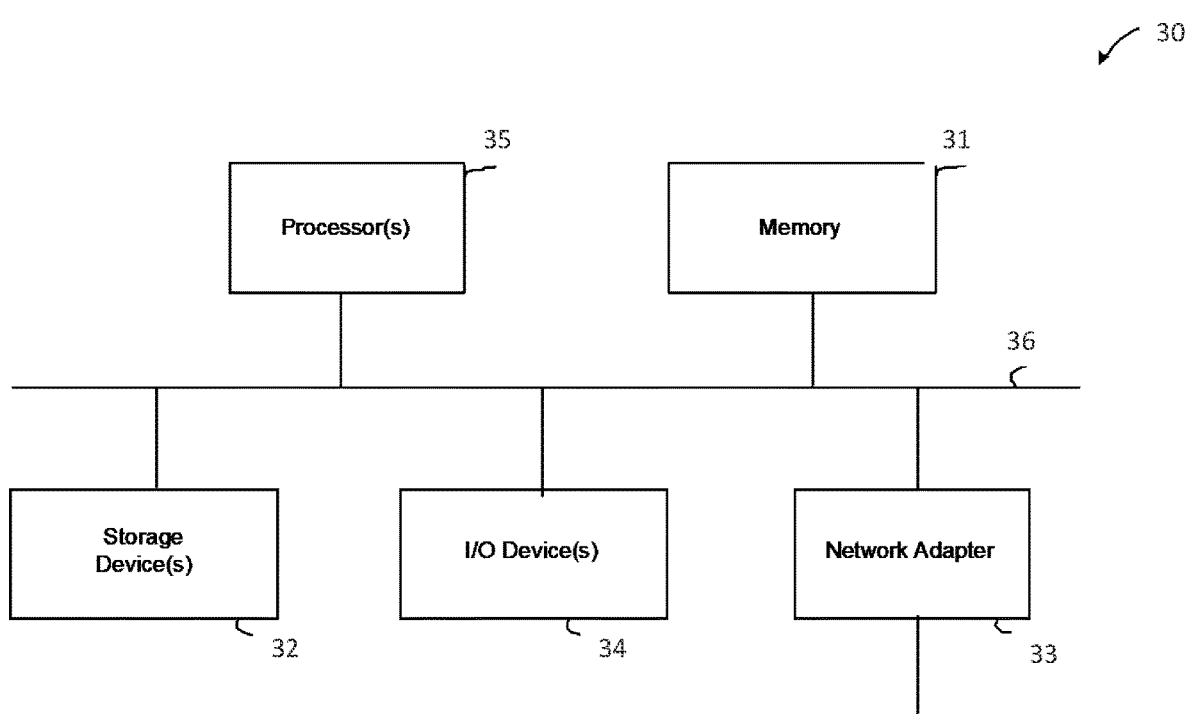
FIG. 3 is a block schematic diagram showing a machine in the example form of a computer system within which a set of instructions for causing the machine to perform one or more of the methodologies discussed herein may be executed.

FIG. 3 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 30 may include one or more central processing units ("processors") 35, memory 31, input/output devices 34, e.g. keyboard and pointing devices, touch devices, display devices, storage devices 32, e.g. disk drives, and network adapters 33, e.g. network interfaces, that are connected to an interconnect 36.

In FIG. 3, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also referred to as Firewire.

The memory 31 and storage devices 32 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 31 can be implemented as software and/or firmware to program one or more processors to carry out the actions described above. In some embodiments of the invention, such software or firmware may be initially provided to the processing system 40 by downloading it from a remote system through the computing system, e.g. via the network adapter 33.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, to example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for reading own writes using context objects in a distributed database, comprising:
   receiving, at a node storing at least a portion of the distributed database, from a client application, a write operation to a table in said distributed database, wherein each write operation to said table comprises writes to one or more tablets;
   creating, by the node, a context object in response to the write operation being initiated or completed, wherein said context object retains ranges of tablets affected by said write operation; and
   sending, by the node, said context object to said client application, said context object comprising information on all tablets within said database that are impacted by said write operation by said client application, wherein the client application uses the context object to reduce a number of tablets of a query during verification of indexing operations to an intersection of tablets involved in the query and tablets involved in said write operation.

2. The method of claim 1, wherein said context object further comprises a list describing key ranges that said client application has updated.

3. The method of claim 1, wherein said context object further comprises timestamp data.

4. The method of claim 3, wherein said context object comprises a timestamp for updates resulting from said write operation comprising a latest timestamp of any update to any tablet in said table.

5. The method of claim 3, wherein said context object comprises a timestamp for each key range that was updated by said write operation.

6. The method of claim 1, further comprising:
   responding to a write operation for a respective tablet by returning a confirmation of the write operation for the respective tablet along with a timestamp associated with the write operation for the respective tablet.

7. The method of claim 1, further comprising:
   asynchronously writing records of a respective tablet to one or more secondary indexes; and
   maintaining a minimum timestamp of any pending secondary index write operations for the respective tablet.

8. The method of claim 7, further comprising:
   determining when a particular write operation has propagated successfully to said secondary indexes by testing said minimum timestamp against a timestamp for said write operation.

9. The method of claim 1, further comprising:
   in association with a client application reading data associated with the write operation:
      using said context object associated with a write operation to test for completion of all indexing operations associated with the write operation; and
      waft for completion of the indexing operations, wherein said client application reads data, after indexing operations complete and indexes reflect results of said write operation.

10. The method of claim 1, further comprising:
    comparing a pending index timestamp for any tablets of the query to a timestamp or timestamps in said context object.

11. The method of claim 1, further comprising:
    passing the contents of said context object from the client application to a second client application.

12. The method of claim 11, wherein the second client application receiving said context object performs a test for index currency in a same manner as that of the client application from which the context object was received.

13. The method of claim 1, further comprising:
    returning contents of said context object to a Web browser in the form of a cookie.

14. The method of claim 13, further comprising:
decoding said cookie back into said context object by a Web application server; and
using said context object to verify that indexing operations have completed relative to a particular write operation.

15. The method of claim 1, further comprising:
combining context objects to test indexing status of all of multiple writes in a single test.

16. The method of claim 15, further comprising:
for said combination, keeping a union of all affected tables and a maximum of any timestamps;
wherein an immediate subsequent read or write operation to said table has a secondary index for the table that is true and up-to-date, reflecting the write operation.

17. The method of claim 16, further comprising:
each tablet in the node having its own internal structure for storing information about what data in the table is changed data and how much of the changed data has been synchronized with tables of a secondary index for the table.

18. The method of claim 1, further comprising:
tracking non-local replicas of said table with a respective context object for each replica of a given tablet by providing a minimum timestamp tor a pending replication to the replica of the given tablet;
using said minimum timestamp to determine whether any data written by a client application had been replicated to a replica of the table, wherein each tablet in the replica of said table records a last applied timestamp of any replication from another tablet; and
using said context object to probe the replica of said table to determine if data written as part of the write operation associated with the context object has been fully propagated to the replica of said table.

19. An apparatus for reading own writes using context objects in a distributed database, comprising:
a processing unit; and
a memory containing instructions that, when executed by the processing unit,
cause the processing unit to:
request, by a client application, one or more writes to a plurality of tablets that comprise said distributed database and that are associated with a table;
perform, for each tablet of said plurality of tablets, index writes to an index table;
return, from said tablets in response to said write request, one or more context objects before said index writes have completed, wherein said one or more context objects comprise a plurality of corresponding timestamps and wherein each timestamp is associated with a corresponding one of said tablets and is configured to maintain original changes for pending index writes for each tablet,
use said timestamps for each said tablet to determine whether a write has been propagated successfully; and
probe, by said client application or any other program with a copy of the context object, said tables to determine if changes due to an original write request have been propagated to said tables.

20. A method for reading own writes using context objects in a distributed database, comprising:
performing, by a client application, a write operation to a table in a database comprised of a plurality of tablets, wherein each write operation to said table comprises write operations to one or more of said tablets;
receiving, at said client application, a context object containing information for all tablets that are impacted by said write operation, said information comprising a list of key ranges of the client application that have been updated as a result of said write operation and corresponding timestamp data;
responding to a write operation by returning, from a respective tablet, a confirmation of the write operation along with a timestamp associated with each write operation;
asynchronously writing records to any secondary indexes of said table and maintaining a minimum timestamp of any pending secondary index writes; and
using said context object to determine completion of all indexing operations when said client application reads data from the table.

21. The method of claim 1, further comprising:
maintaining independent statistical estimates of indexing delays in said tablets;
combining said independent statistical estimates of indexing delays with timestamps of pending indexing operations to determine an optimistic estimate of an earliest time that there is a significant probability that a particular timestamp is cleared;
returning said estimate to said client application; and
said client application using said estimate as a time to delay until a next time that said client application queries said tablets to determine if all write operations of interest have been indexed.

* * * * *